(No Model.)  5 Sheets—Sheet 1.

J. A. DORING.
SEWING MACHINE.

No. 284,190.  Patented Sept. 4, 1883.

Attest:
George Tilghman
F. W. Howard

Inventor:
Julius A. Doring
by W. H. Babcock
Attorney (No Model.) 5 Sheets—Sheet 2.
J. A. DORING.
SEWING MACHINE.
No. 284,190. Patented Sept. 4, 1883.
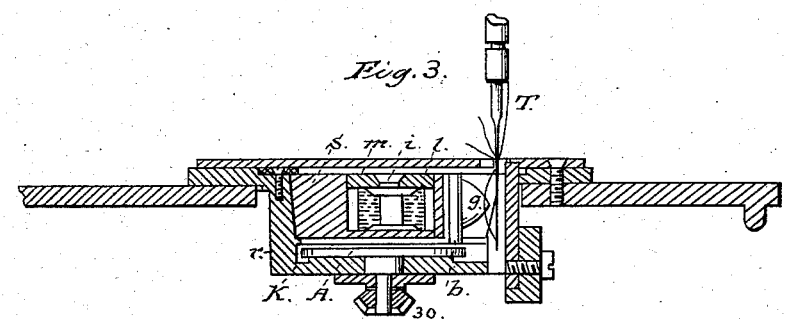
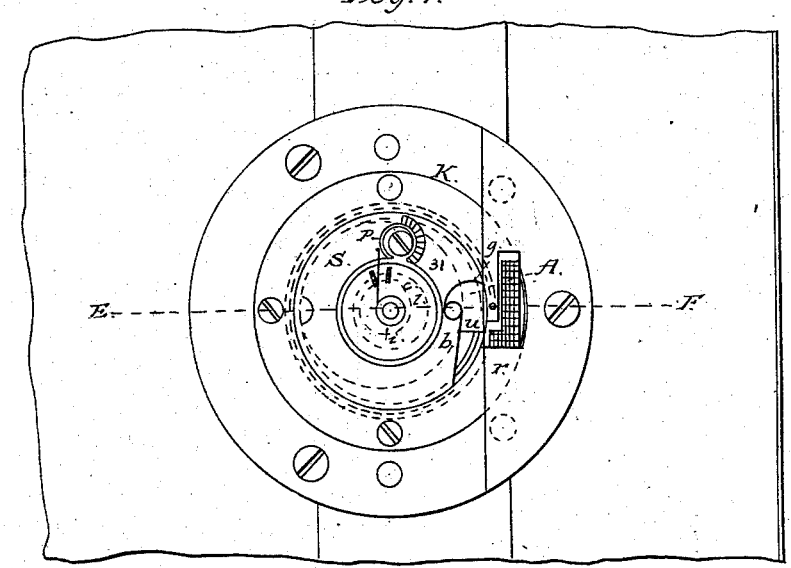
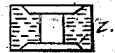
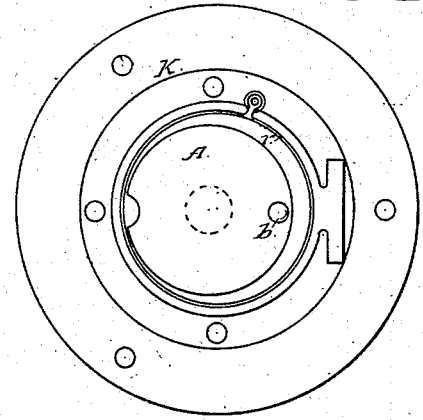
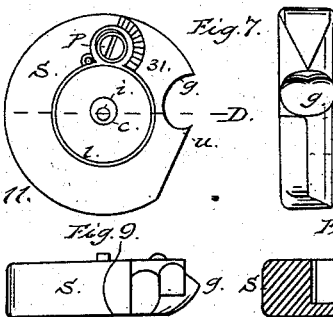
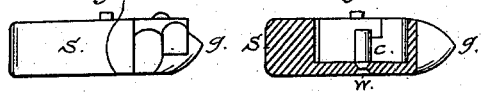
Attest:
George Tilghman
F. W. Howard
Inventor:
Julius A. Doring
by W H Babcock
Attorney (No Model.)  5 Sheets—Sheet 3.
J. A. DORING.
SEWING MACHINE.
No. 284,190. Patented Sept. 4, 1883.
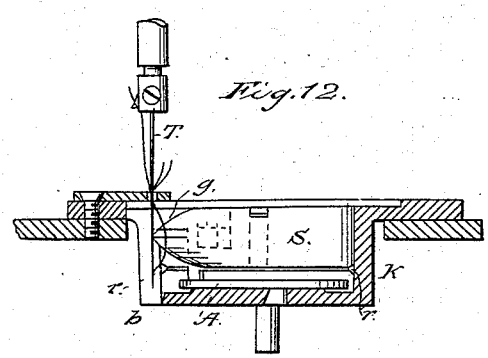
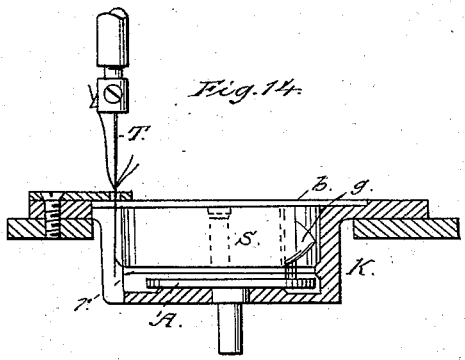
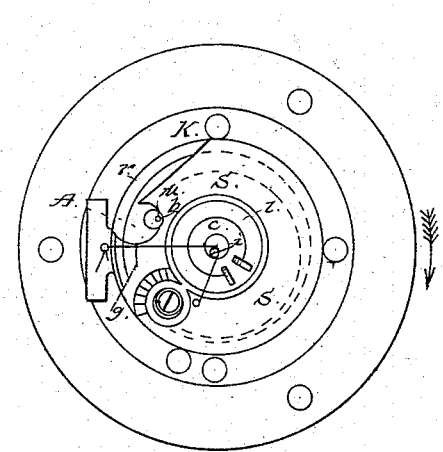
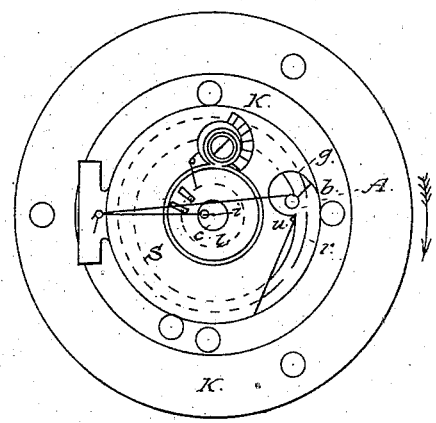

(No Model.)
5 Sheets—Sheet 4.
J. A. DORING.
SEWING MACHINE.
No. 284,190.
Patented Sept. 4, 1883.
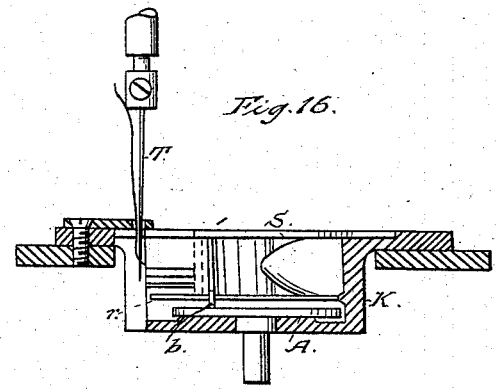
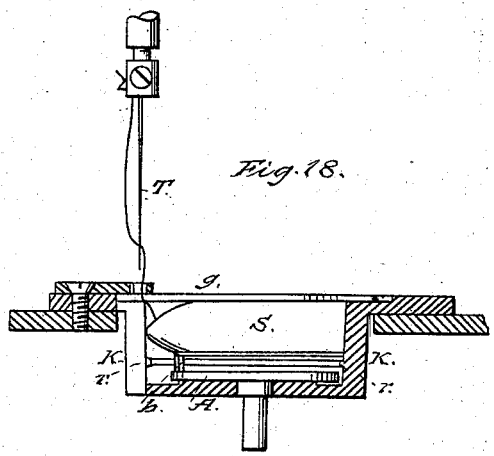
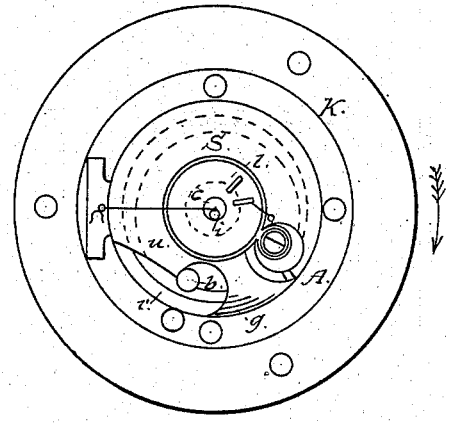
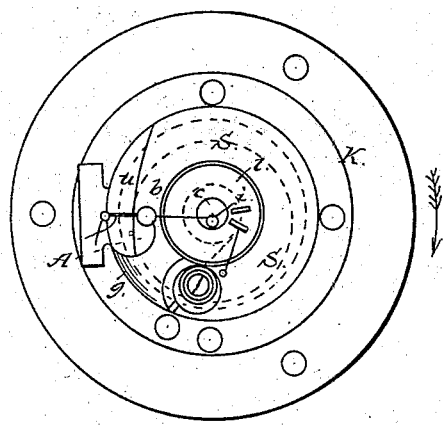
Attest:
George Tilghman
H. W. Howard
Inventor:
Julius A. Doring
by W. H. Babcock
Attorney (No Model.)

J. A. DORING.
SEWING MACHINE.

No. 284,190. Patented Sept. 4, 1883.

5 Sheets—Sheet 5.

Attest:
George Tilghman
F. W. Howard

Inventor:
Julius A. Doring
by W. H. Babcock
Attorney

UNITED STATES PATENT OFFICE.

JULIUS ALBERT DÖRING, OF LEIPSIC, GERMANY.

SEWING-MACHINE.

SPECIFICATION forming part of Letters Patent No. 284,190, dated September 4, 1883.

Application filed September 27, 1882. (No model.)

*To all whom it may concern:*

Be it known that I, JULIUS ALBERT DÖRING, a citizen of Germany, residing at the city of Leipsic, in the Empire of Germany, have invented a new and useful Improvement in Sewing-Machines, of which the following is a specification.

Figure 1:
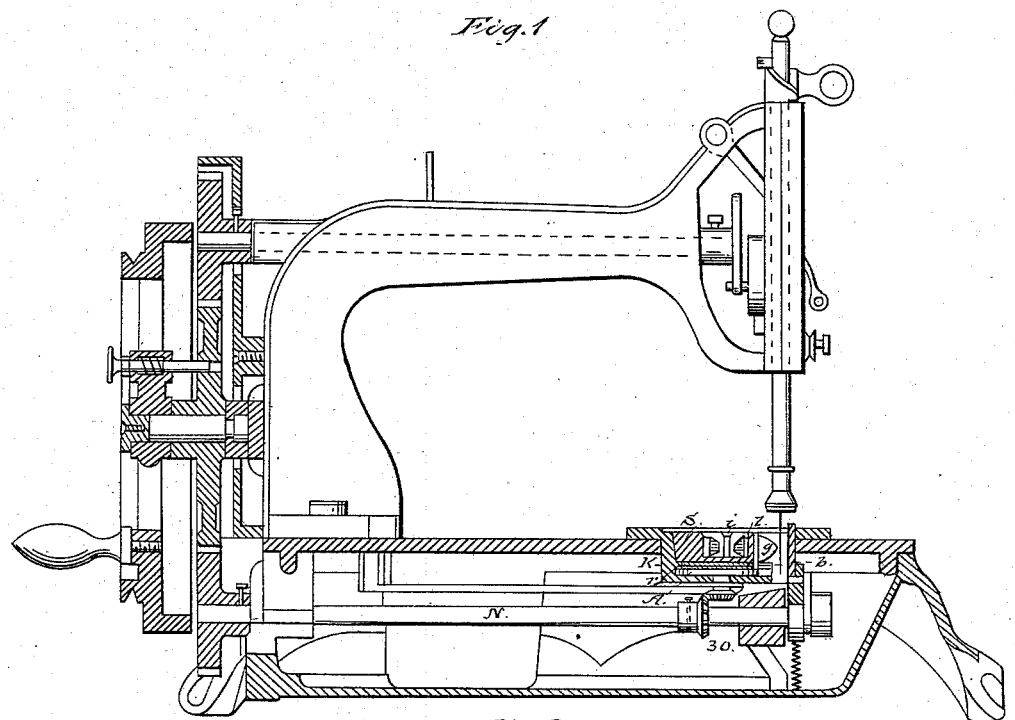
Figure 2:
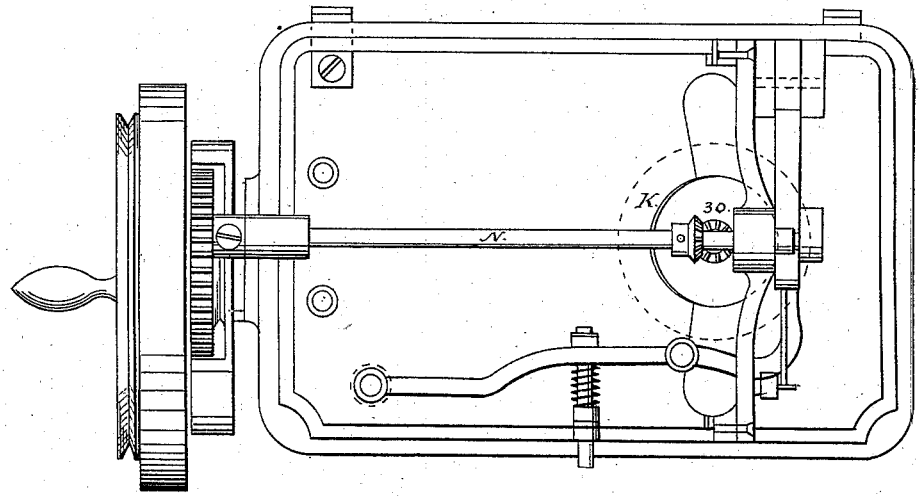
Figure 20:
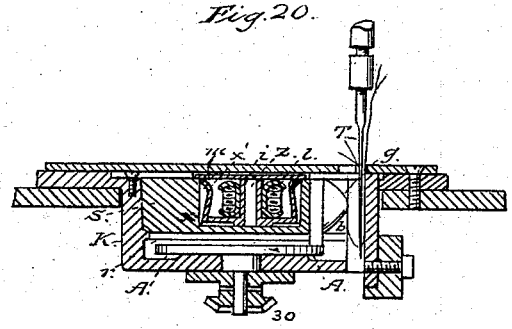
Figure 26:
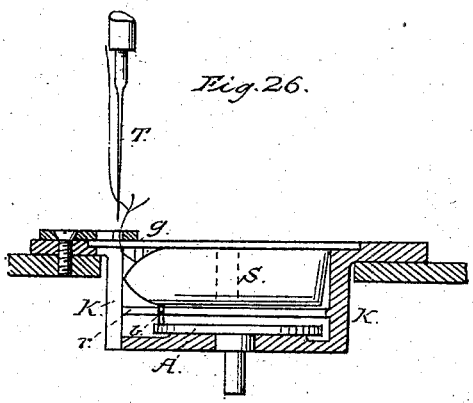
Figure 21:
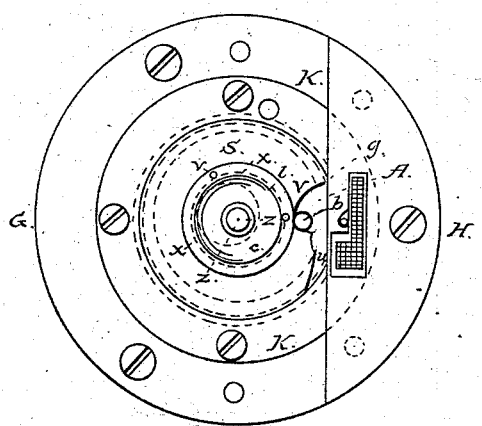
Figure 27:
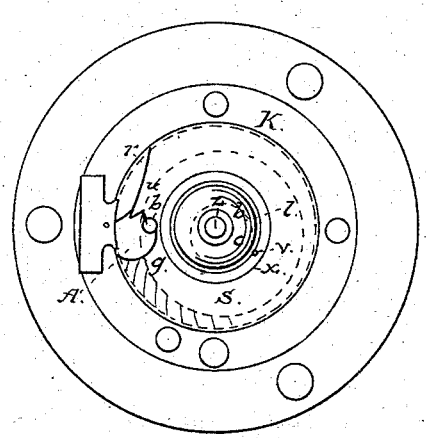
Figure 22:
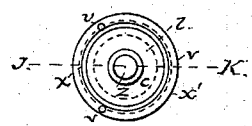
Figure 23:
Figure 25:
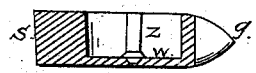
Figure 24:
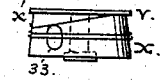

In the accompanying drawings, Figure 1 is a section of a sewing-machine embodying my invention. Fig. 2 is a reversed plan of the same. Fig. 3 is a section, and Fig. 4 a top view, (enlarged,) of the shuttle and disk-bobbin and proximate devices. Figs. 5 to 19 represent details and different positions referred to in the specification. Figs. 20 to 27 represent different views of my improved disk-bobbin and proximate devices referred to in the following specification.

Similar letters represent similar parts in all the figures.

In the top plate or table of the sewing-machine, close behind the needle, a circular receptacle, K, is attached. Near the lower part, in the inside of this receptacle, a small projecting rim, $r$, is arranged, upon which the shuttle S is supported. The inside of the receptacle K and the outside of the shuttle S are made slightly conical—that is, the inner face of the receptacle flares upward and outward and the outer face of the shuttle fits the same—to allow for the wear of the shuttle, and thereby insure the accurate fit of the shuttle at all times in the inside of the receptacle K. The shuttle S is provided with a circular recess to receive the bobbin or thread-spool, and with a suitable recess at one side, one end of which forms the necessary hook $g$, which passes into the loop of the needle-thread, and holds said loop while the same passes around the shuttle S. The recess or cavity to receive the bobbin or thread-spool $l$ in the shuttle, and the bobbin or thread-spool $l$ is kept in its place by a small plate or cover, $m$, having a hole, $i$, eccentric to the center of the bobbin, for the purpose hereinafter described, through which the spool-thread passes.

In the bottom of the receptacle K a disk, A, is arranged, receiving the required rotating motion through the gear-wheels 30 and shaft N. The center of this disk A is some distance behind the center of the shuttle S, and consequently eccentric to the same; and the disk A is provided with a projecting driving-pin, $b$, engaging into the recess in the side of the shuttle S before its hook $g$, to give motion to said shuttle S. On account of the center of the disk A being eccentric to the center of the shuttle S, a peculiar motion is produced by the pin $b$ in the recess in the side of the shuttle S, for the purpose hereinafter described.

Figs. 4 and 7 illustrate the ordinary tension device, P, provided with a scale, 31, to indicate the proper amount of tension for the material operated on, said tension device being used with a thread-spool, $l$, of ordinary construction. This tension device requires the spool to be placed in such a position that it will turn in one direction only while the thread is unwound. This device P forms no part of my invention, but is illustrated for purposes of comparison and explanation. To obviate these difficulties I arrange the spool as shown in plan, section, and outside view in Figs. 22, 23, and 24.

In the central recess of the shuttle S a slightly-conical cup, $x$, is placed, provided with an upper external rim, $x'$, and a central sleeve, $c$. The outside diameter of the external rim, $x'$, and the diameter of the bottom of the cup $x$ correspond with each other and fit exactly into the recess in the center of the shuttle S, and the sleeve $c$ fits over a central pin, $z$, firmly attached to the shuttle S, and provided with a conical head, $w$, and over the sleeve $c$ the thread-bobbin $l$ is placed. The cup $x$ is free to move on the pin $z$, and the bobbin $l$ moves freely around the sleeve $c$. In the side of the cup $x$ a hole, 33, is made, and in the projecting rim $x'$ of said cup two or more holes, $v$, are made. The thread from the bobbin $l$ is passed through the hole 33, wound two or three times around the outside of the cup $x$, and then passes through one or more of the holes $v$ in the rim $x'$, and lastly through the above-mentioned hole $i$, eccentrically made in the cover $m$, to the outside of the shuttle. This arrangement of the spool-thread, after leaving the spool $l$ until it passes through the hole $i$, gives the desired necessary tension to said thread, and has the advantage that this tension will always remain the same, independent of the diameter of thread wound upon the spool.

The operation is as follows: When the needle T has arrived at its lowest point of motion, Figs. 12 and 13, the hook $g$ of the shuttle S passes through the needle-thread, forming a loop, which is retained in the recess near the hook $g$, and passed by the further motion of the shuttle S around the body of the same, Fig. 15, without much friction, as the shuttle rests only at its outer circumference upon the small rim $r$ in the receptacle K. The further motion of the shuttle S, and consequently of the loop of the needle-thread, brings the same around the spool-thread, passing through the hole $i$, Figs. 16 and 17. The upward motion of the needle T carries this loop with it until said loop comes into a position in the recess of the shuttle to pass out of the same behind the driving-bolt $b$ clear of the shuttle S, Figs. 18 and 19. In the forward end of this recess, in the side of the shuttle, a very small cavity, $u$, (see Figs. 15 and 19,) is made, which this loop must pass before it leaves the shuttle, and wherein said loop is retained in consequence of the eccentric motion of the driving-bolt $b$ coming in that position, Fig. 19, directly in front of said cavity $u$, (or loop-retainer,) until the upward motion of the needle T has produced the required necessary tension on its needle-thread. The required necessary strain or tension to the spool-thread in the formation of the stitch independent to the tension given to the spool-thread while leaving the spool, and which is an essential point in the production of a regular firm seam, is produced by the above-mentioned eccentric position of the hole $i$, which, during the formation of the loop, is nearest to the needle T, (see Figs. 13 and 15,) and farthest away from the needle T where the loop is drawn taut. (See Figs. 17 and 19.)

What I claim as my invention, and desire to secure by Letters Patent, is—

1. A rotating shuttle, a thread-spool contained therein, and a cover having a hole eccentric to said shuttle, in combination with a cup, $x$, exterior to said shuttle, in contact with which cup the thread passes between said spool and said cover for purposes of tension.

2. In combination with the shuttle S and thread-spool $l$, the cup $x$, with rim $x'$, hole 33, and two or more holes, $v$, in its rim $x'$, arranged to operate in combination with the spool-thread, substantially as and for the purpose set forth.

JULIUS ALBERT DÖRING.

Witnesses:
 ALFRED HERMANN GRETSCHEL,
 HERM. LEITERT.